Jan. 4, 1927.
F. M. JACKSON
YOKE
Filed March 27, 1926
1,613,109
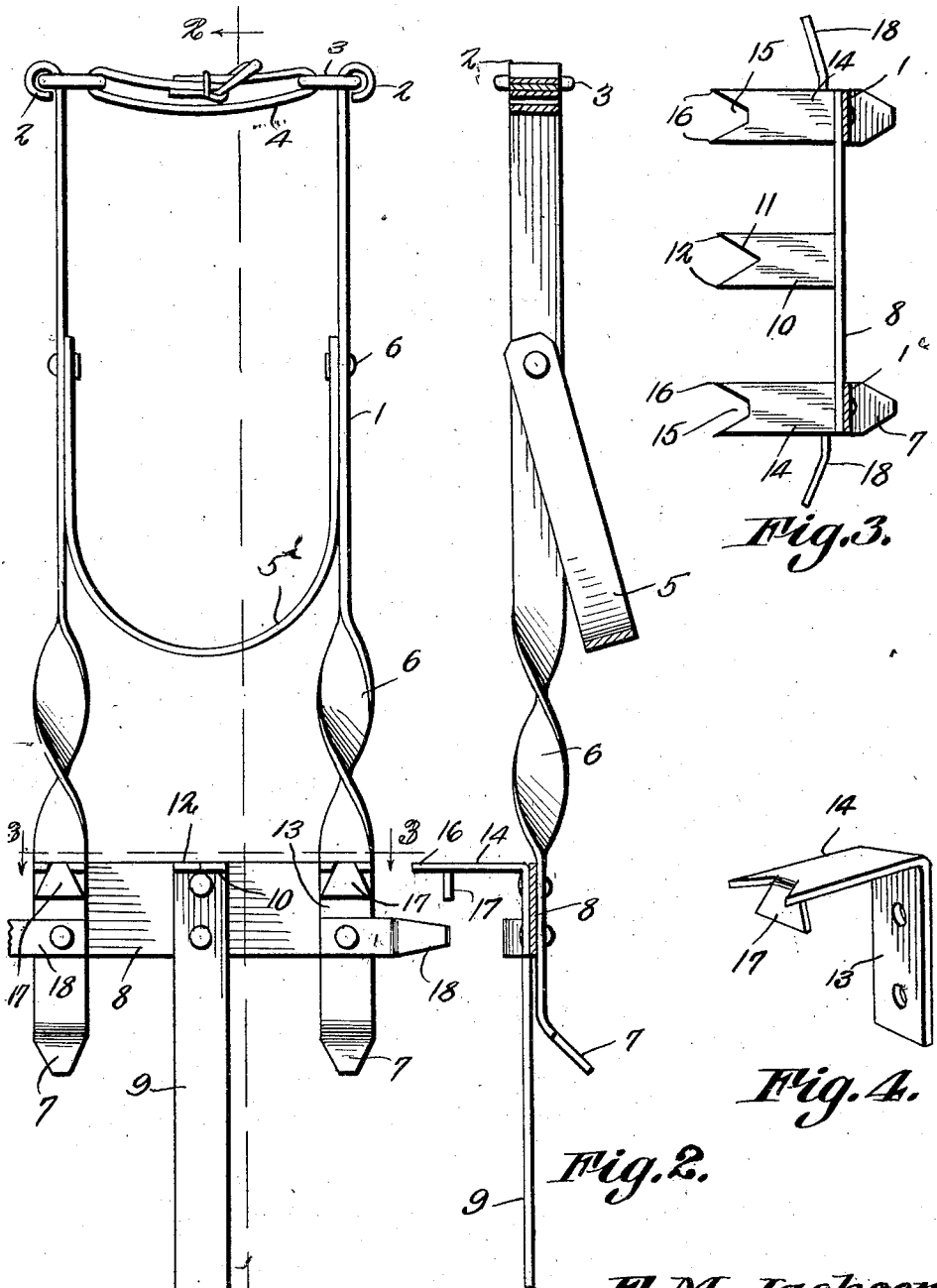
F. M. Jackson
Inventor
By C. A. Snow & Co.
Attorneys.

Patented Jan. 4, 1927.

1,613,109

UNITED STATES PATENT OFFICE.

FRANCIS M. JACKSON, OF RUSSIAVILLE, INDIANA.

YOKE.

Application filed March 27, 1926. Serial No. 97,970.

This invention relates to a yoke for use on live stock to prevent them from jumping fences and from pushing against fences and tramping them.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a front elevation of the yoke.

Figure 2 is a section on line 2—2, Figure 1.

Figure 3 is a section on line 3—3 Figure 1.

Figure 4 is a perspective view of one of the spurred brackets.

Referring to the figures by characters of reference 1 designates side strips provided with eyes 2 at their upper ends for engagement by rings 3 which, in turn, are connected by an adjustable strap 4. A U-shaped strip 5 is pivotally connected as at 6 to the side strips 1 and is adapted to extend under the neck of the animal to which the yoke is applied, strap 4 being extended over and adapted to bear upon the neck.

The side strips 1 are twisted as shown at 6 and their lower ends are inclined downwardly and rearwardly and slightly tapered as at 7. These side strips are connected by a cross strip 8 to the center of which is riveted or otherwise fastened a depending tongue 9. The upper end of this tongue is extended forwardly as at 10 and has a V-shaped recess 11 in its free end providing spaced prongs or spurs 12.

Secured to the end portions of the cross strip 8 are angular brackets 13 having forwardly extending portions 14 in the free ends of which are provided recesses 15 so that spaced prongs or spurs 16 are thus formed. The metal cut from the brackets 14 in the formation of these recesses 15 is bent downwardly to provide stop ears 17.

This yoke is adapted to be placed upon the neck of an animal and the depending tongue 9 will drag along the ground to permit grazing. However when the animal makes an attempt to jump a fence the strips 1 and the cross strip 8 will swing forwardly so that the prongs 16 will engage the fence, the movement being more or less limited by the depending ears 17 engaging the fence.

For the purpose of affording additional means for engaging a fence spurs 18 are secured to and extend laterally from the ends of the cross strip 8 to keep an animal away from a fence. These spurs are curved forward slightly as shown.

What is claimed is—

1. In a device of the class described a cross strip, side strip secured thereto, means connecting the side strips for attaching them to the neck of an animal, said side strips having downwardly and backwardly inclined lower end portions below the cross strip, a tongue secured to and depending from the cross strip, a forwardly extending portion upon the tongue having spaced spurs, brackets secured to the cross strip and having forwardly extending portions, spurs thereon, and a stop ear depending from each bracket between the spurs.

2. A device of the class described including side strips, a cross strip connecting the side strips, means for attaching them to the neck of an animal, forwardly extending spurs fixedly secured to the front of the cross strip, laterally extending spurs fixedly secured to the ends of the cross strip, and stop ears adjacent the first named spurs.

In testimony that I claim the foregoing as my own, I have hereto affixed my signature.

FRANCIS M. JACKSON.